(12) United States Patent
King et al.

(10) Patent No.: US 10,754,355 B2
(45) Date of Patent: Aug. 25, 2020

(54) WELD SHIELDING APPARATUS AND METHOD OF USE

(71) Applicant: Pacesetter, Inc., Santa Clara, CA (US)

(72) Inventors: Justin King, Clemson, SC (US);
Russell Bruch, Seneca, SC (US);
Nicholas R. Hamor, Easley, SC (US);
Kurt Erickson, Anderson, SC (US)

(73) Assignee: Pacesetter, Inc., Santa Clara, CA (US)

( * ) Notice: Subject to any disclaimer, the term of this patent is extended or adjusted under 35 U.S.C. 154(b) by 304 days.

(21) Appl. No.: 15/820,020

(22) Filed: Nov. 21, 2017

(65) Prior Publication Data

US 2018/0157278 A1 Jun. 7, 2018

Related U.S. Application Data

(60) Provisional application No. 62/429,464, filed on Dec. 2, 2016.

(51) Int. Cl.
*B23K 11/00* (2006.01)
*G05D 7/06* (2006.01)
*B23K 11/24* (2006.01)

(52) U.S. Cl.
CPC .......... *G05D 7/06* (2013.01); *B23K 11/0006* (2013.01); *B23K 11/24* (2013.01)

(58) Field of Classification Search
CPC ........ B23K 11/0006; B23K 11/24–248; B23K 11/0026

USPC .......... 219/50, 86.24, 86.7; 700/207
See application file for complete search history.

(56) References Cited

U.S. PATENT DOCUMENTS

| 4,536,637 A | 8/1985 | Horiuchi et al. |
| 4,785,154 A * | 11/1988 | Moody ................ B23K 11/046 219/103 |
| 5,045,668 A * | 9/1991 | Neiheisel ............ B23K 26/032 219/121.83 |
| 5,712,462 A | 1/1998 | Berkowitz et al. |
| 8,449,712 B2 * | 5/2013 | Inamoto .................. H01L 24/75 156/272.2 |
| 2016/0001391 A1 * | 1/2016 | Nacey .................... B23K 9/325 219/74 |
| 2017/0136568 A1 * | 5/2017 | Kundrat ................ B23D 65/00 |

FOREIGN PATENT DOCUMENTS

DE 202014103058 * 8/2014 ............. B23D 65/00

* cited by examiner

*Primary Examiner* — David P Angwin
*Assistant Examiner* — Nicholas A Ros (57) ABSTRACT

A resistance weld shielding control system includes a computer that is executed to control a fixture to receive and hold at least one part to be welded. The computer also controls one or more electrodes to apply electrical energy to the part for welding the at least one part, and controls a gas delivery system to direct an inert gas onto the part for shielding the part from the ambient atmosphere via a nozzle. The nozzle is configured in the fixture such that the fixture holds the nozzle in a fixed physical relationship to the part.

12 Claims, 8 Drawing Sheets

WELD SHIELDING APPARATUS AND METHOD OF USE

CROSS-REFERENCE TO RELATED APPLICATION

This application claims the benefit of and priority to U.S. Provisional Patent Application Ser. No. 62/429,464, filed Dec. 2, 2016, entitled, "WELD SHIELDING APPARATUS AND METHOD OF USE."

FIELD OF INVENTION

The present invention generally relates to welding devices, and more particularly, to a weld shielding device apparatus and method of using the same.

BACKGROUND

Typical resistance weld applications such as flat surface to flat surface geometry can be performed in atmosphere because the joining materials' geometry prevents air from interacting with the weld nugget during formation. Medical devices, however, commonly have a more complex geometry that does not protect the weld nugget during formation. Furthermore, material sets used in medical devices may often consist of mixed metallurgy and oxygen sensitive materials such as titanium, molybdenum (Moly), and nickel that may be deformed during the welding process. Therefore, there is a need in the art for improved welding methods and apparatuses.

SUMMARY

In a first aspect, the disclosure relates to a resistance weld shielding apparatus including a fixture, wherein the fixture comprises a receptacle to receive and hold at least one part; at least one electrode to apply electrical energy to the part for welding the at least one part; and a gas delivery system comprising a nozzle to direct an inert gas onto the part for shielding the part from the ambient atmosphere when the part is being welded. In certain embodiments, the nozzle is configured in the fixture such that the fixture holds the nozzle in a fixed physical relationship to the part.

In another aspect, the disclosure relates to a resistance weld shielding control system including a control circuit, wherein the control circuit comprises at least one memory for storing instructions that when executed by at least one processor, is executed to: control a fixture to received and hold at least one part; control at least one electrode to apply electrical energy to the part for welding the at least one part; and control a gas delivery system to direct an inert gas onto the part for shielding the part from the ambient atmosphere when the part is being welded. In certain embodiments, the fixture comprises a nozzle configured in the fixture such that the fixture holds the nozzle in a fixed physical relationship to the part.

In yet another aspect, the disclosure relates to a resistance weld shielding control system including a computer that is executed to control a fixture to receive and hold at least one part to be welded. The computer also controls one or more electrodes to apply electrical energy to the part for welding the part, and controls a gas delivery system to direct an inert gas onto the part for shielding the part from the ambient atmosphere via a nozzle. The nozzle is configured in the fixture such that the fixture holds the nozzle in a fixed physical relationship to the part.

Other aspects of the disclosure relate to methods, apparatuses, control systems, fixtures and parts related thereto.

Additional embodiments and features are set forth in part in the description that follows, and will become apparent to those skilled in the art upon reading of the specification.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope.

DETAILED DESCRIPTION

Embodiments of the present disclosure provide a resistance weld shielding system and method that shields a part to be welded via the use of a resistance welding robot that employs a fixture to maintain the nozzles of a gas delivery system in fixed physical relationship to the part. The fixed positioning of the nozzles provides a consistent, repeatable inert gas barrier for protecting the part from the ambient environment. Additionally, a programmed gas delivery process is provided in which the inert gas may be delivered using a specified welding profile for optimally shielding the part during the welding operation while not generating undue turbulence via the delivery of excessive inert gas and/or creating an insufficient barrier region via the delivery of tool little inert gas.

The use of resistance welding robots may provide certain benefits over traditional manual resistance welding techniques in that they typically provide more repeatable weld patterns than what could otherwise be provided using manual resistance welding techniques. In certain embodiments, welding robots can include a welding device that has electrodes to generate an electrical current through two or more metal parts in a manner such that a specified portion of those parts become molten and fuse together to form a single piece. Because most metals oxidize readily in the presence of ambient atmospheric conditions at high temperatures, the welding robots can include an inert gas delivery system that blows an inert gas over the molten portions of the metal parts, thus providing a barrier between the parts and the ambient environment.

Welding robots are well suited for applications involving high volume production. Moreover, for applications in which the parts to be welded are relatively small, fixtures are provided to receive and hold (e.g., lock) the parts in a specific position and orientation so that the electrodes of the welding robots may be consistently applied to the parts at fixed physical relation to the parts. Thus, according to certain embodiments, a welding robot may be configured to function with multiple fixtures that are each designed and constructed for a particular type of part or parts to be welded.

Figure 1:
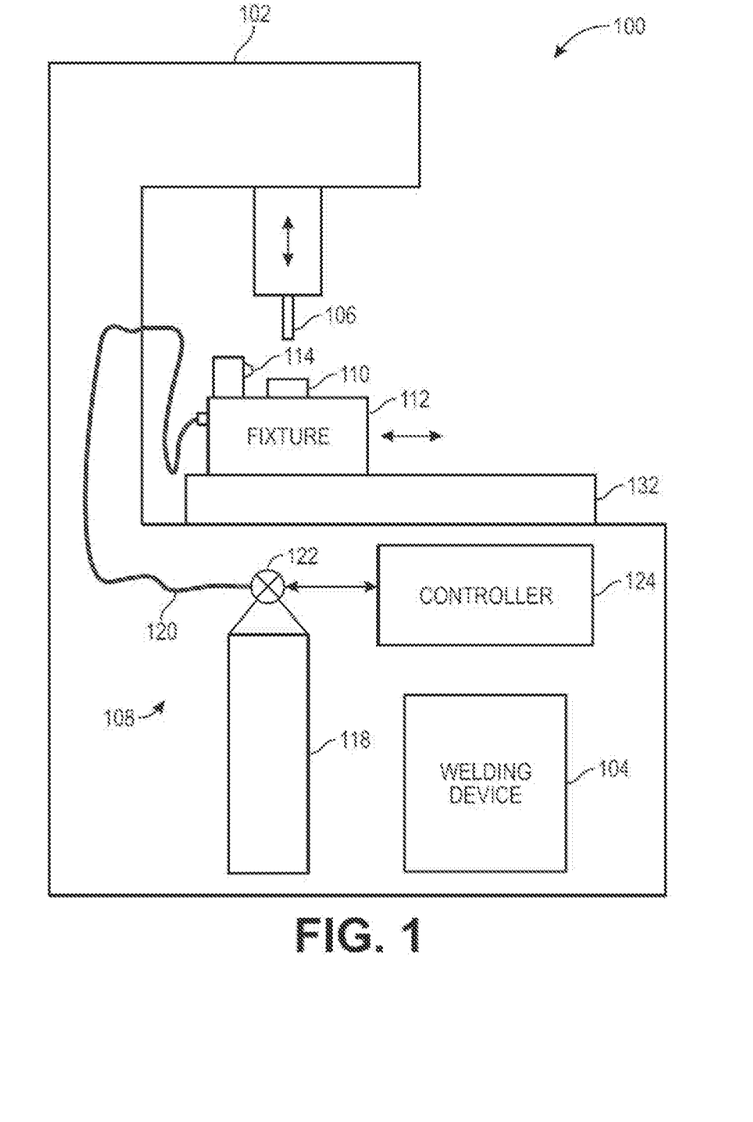
FIG. 1 illustrates a resistance weld shielding system that may provide a solution to the aforementioned problems described above.

FIG. 1 illustrates a resistance weld shielding system 100 that generally includes a welding robot 102 having a welding device 104 that is electrically coupled to one or more electrodes 106, and a gas delivery system 108 that directs an inert gas onto one or more parts 110 to be welded. According to the teachings of the present disclosure, a fixture 112 is provided in which one or more nozzles 114 of the gas delivery system 108 are mounted so that the fixture 112 holds the nozzles 114 in a fixed physical relationship to the part to be welded. By holding the nozzles 114 of the gas delivery system 108 in a fixed physical relationship with the parts 110, a repeatable, consistent barrier may be formed each time the parts 110 are welded.

One drawback of conventional welding techniques is that they are limited in their ability to produce adequate results when used to weld small parts. For example, certain devices used in the medical industry often require the weldment of relatively small parts. Further, certain components used in the fabrication of medical implant devices often require welded structures comprising a molybdenum wire filament of approximately 0.020 inches in diameter to be welded to a titanium plate having a thickness of only 0.010 inches thick.

Conventional welding procedures for applications such as these have typically been performed without the assistance of any gas delivery system because of the inherent difficulty in directing a proper amount of gas barrier to the welded portion of the parts. For example, gas delivery systems typically involve the use of a nozzle that is manually positioned to direct an inert gas flow approximately close to the portions of the parts being welded. In many cases, however, the flow is too strong such that turbulence is developed which disrupts the flow of the molten metal, or too little flow is developed such that an insufficient barrier is formed.

Embodiments of the present disclosure provide a solution to this problem by fixing the nozzles of the gas delivery system in the fixture that is used to mount the parts so that a consistent, precise inert gas flow is maintained around the regions of the parts being welded. Additionally, because the nozzles are fixedly attached to the fixture, the position, direction, and size of the nozzles may be tailored according to the shape, size, and orientation of the parts being welded, so that an optimum barrier may be generated for protection of the parts from the ambient environment.

One example application that may benefit from embodiments of the present disclosure involves a 201 series nickel cold headed pin that is to be resistance welded to a 304L stainless steel case. In such an application, the addition of cover gas decreased discoloration of the pin, increased the pin pull strength, and increased the number of bend cycles the pin could withstand.

Another example application involves a section of titanium foil to be welded to a molybdenum pin. Without the aid of the inert gas barrier (e.g., cover gas), the weld geometry made the joint more susceptible to contamination because of the flat foil to round pin contact geometry. However, via the aid of the inert gas barrier, the cover gas enabled the welding device to liquefy the titanium and flow it around the molybdenum, without suffering from undue embrittlement.

Another example application involves another pin joint where a round nickel pin is welded perpendicularly relative to a round molybdenum pin. To form a strong and stable joint in this case, the nickel should flow freely around the moly pin. Via the aid of the inert gas barrier, the inert atmosphere created at the weld makes this joint relatively more reliable, repeatable, and manufacturable.

Although only one nozzle 114 is shown for brevity and clarity, it is contemplated that the gas delivery system 108 may include any quantity of nozzles 114, such as two, three, or four or more nozzles. For example, a particular welding application may involve a cylindrical part to be welded to a plate. Thus, first, second, and third nozzles may be configured on the fixture 112 such that the first nozzle directs a first inert gas flow around the outside of the cylindrical part while the second nozzle directs a second inert gas flow inside of the cylindrical part, while the third nozzle directs a third inert gas flow on a surface of the plate opposite the cylindrical part for protecting most or all of the parts from the ambient environment.

In general, the fixture 112 includes a device to temporarily receive and hold the parts to be welded. For example, the fixture 112 may include a clamping mechanism having jaws, or other part embracing mechanism, that holds the parts using a press-type fit. In many cases, the jaws may be fashioned with a surface contour, which is complementary to the shape of the parts being welded so that the parts may be securely placed and held in a specific position and orientation on the fixture 112. Although only one example holding mechanism is described herein, it should be understood that the fixture 112 may comprise any suitable holding mechanism for receiving and holding the parts to be welded without departing from the spirit and scope of the present disclosure.

In an embodiment, a resistance welding device is provided that welds the parts using heat generated by the electrical resistance of the materials, combined with the time and the force used to hold the materials together during welding. In resistance welding, several factors may influence the level of heat produced, such as the size of the workpieces, a metal coating or the lack of coating, the electrode materials, electrode geometry, electrode pressing force, electrical current, and length of welding time. Small pools of molten metal are formed at the point of most electrical resistance between the parts as an electrical current is passed through the metal. The resistance welding device may be well suited for parts of relatively small size where the introduction of an external, consumable weld material is not practical.

The gas delivery system 108 generally includes an inert gas source 118 that is coupled to the fixture 112 with a flexible gas line 120. Additionally, the gas delivery system 108 may include a valve 122 that functions under the control of a controller 124 to selectively open and close the valve 122 for directing the inert gas around the parts 110. In one embodiment, the controller 124 is operable to proportionally open and close the valve 122 for controlling a flow rate of the inert gas onto the parts 110.

The welding robot 102 may also include one or more actuator mechanisms that are controlled by the controller 124 for providing physical movement of certain components. For example, the welding robot 102 may include an actuator configured on a rail device 132 that moves the fixture away from the electrodes 106 for allowing placement of the parts onto the fixture 112, and moves the fixture 112 towards the electrodes 106 to facilitate the welding process. As another example, another actuator may be provided to move the electrodes 106 away from the fixture 112 for allowing movement of the fixture 112, and move the electrodes 106 towards the fixture 112 for performing the welding operation. Nevertheless, it should be understood that the welding robot 102 may include any number and type of actuators without departing from the spirit and scope of the present disclosure.

Figure 2A:
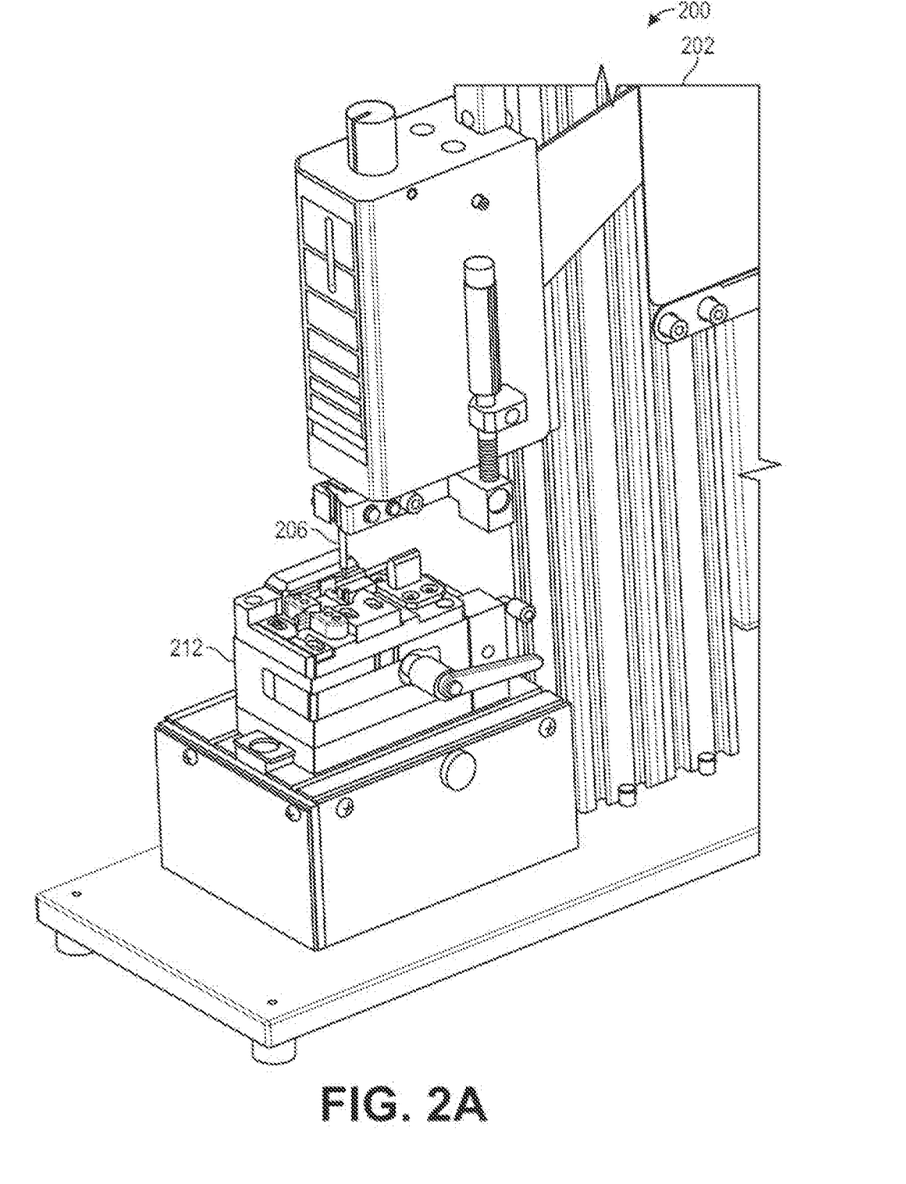
FIGS. 2A through 2D illustrate another example resistance weld shielding system according to one embodiment of the present disclosure.
Figure 2B:
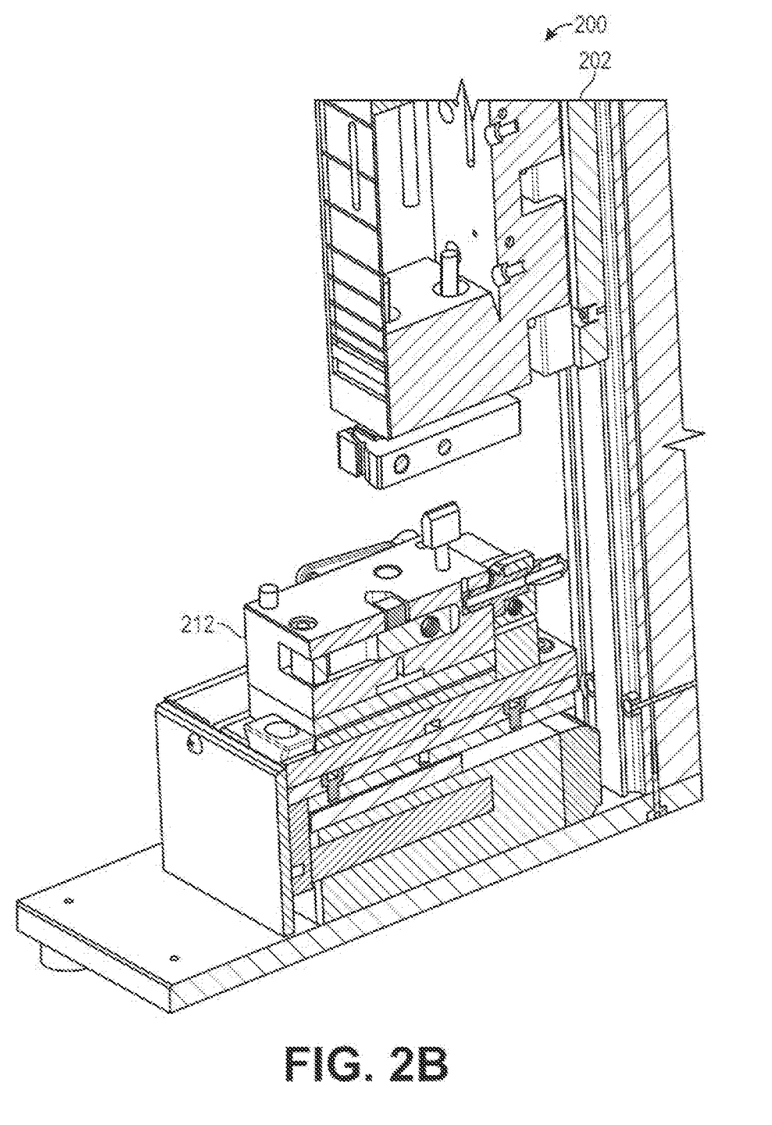
Figure 2C:
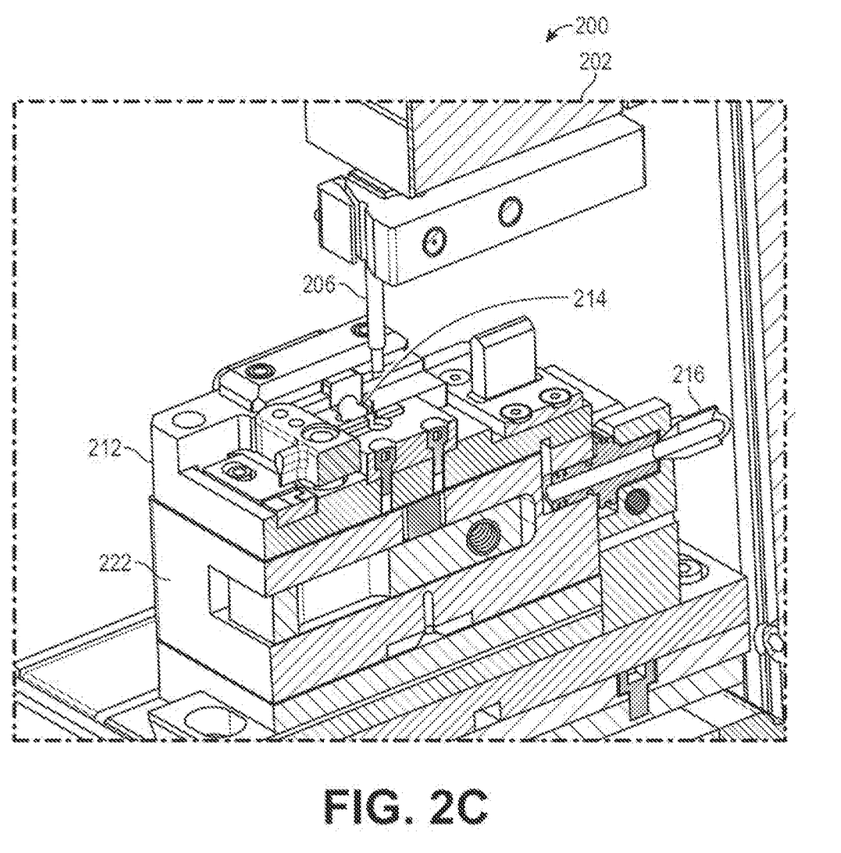

FIGS. 2A through 2D illustrate another example weld shielding system 200 according to one embodiment of the present disclosure. The weld shielding system 200 generally includes a welding robot 202 having one or more electrodes 206, and a fixture 212, similar in design and construction to the welding robot 102, electrodes 106, and fixture 112, respectively, of FIG. 1. In general, FIG. 2A illustrates a partial view of the welding robot 202, FIG. 2B illustrates an enlarged partial view of the welding robot 202 as shown in FIG. 2A, while FIG. 2C illustrates an enlarged partial view of the welding robot 202 of FIG. 2B showing a cut away view of certain components of the fixture 212.

As best shown in FIG. 2C, the fixture 212 is formed from several components 222 that are affixed to one another using bolts. A gas line coupling 216 is also provided for releasable attachment of an inert gas line from an inert gas source (not shown). The gas line coupling 216 is fluidly coupled to a nozzle 214 fixedly mounted on the fixture 212 via one or more channels configured inside of the fixture 212.

Figure 2D:
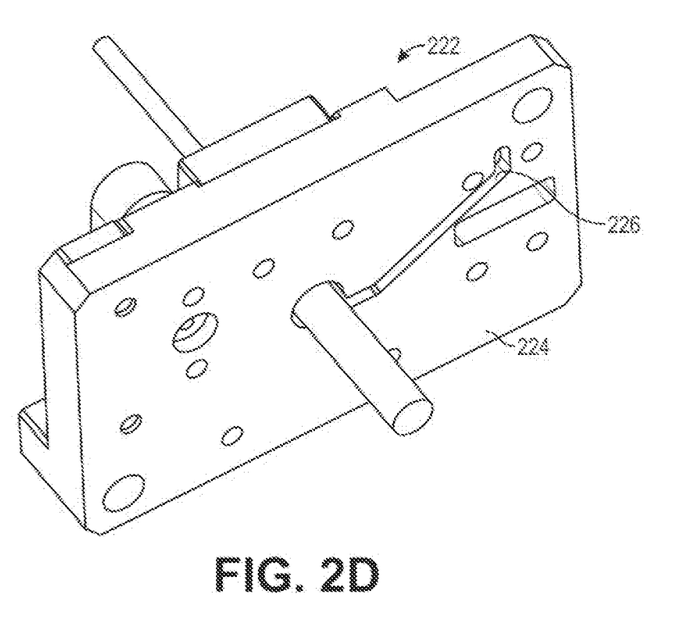

FIG. 2D illustrates on component 222 that has been removed from the fixture 212 according to one embodiment of the present disclosure. As shown, the component 222 has a surface 224 that is to be disposed adjacent the surface of another component of the fixture 212. According to one embodiment, the component 222 has a slot 226 formed in its surface 224 such that, when the component 222 is configured on the fixture 212, the slot 226 and the surface of the other component forms a channel or conduit that fluidly couples the gas line coupling 216 to the nozzle 214. By using this arrangement, fixtures 212 can be fabricated in a relatively quick and efficient manner to fluidly couple the gas line coupling 216 to a nozzle 214 having any suitable position and orientation relative to the parts to be welded using the fixture 212.

Figure 3:
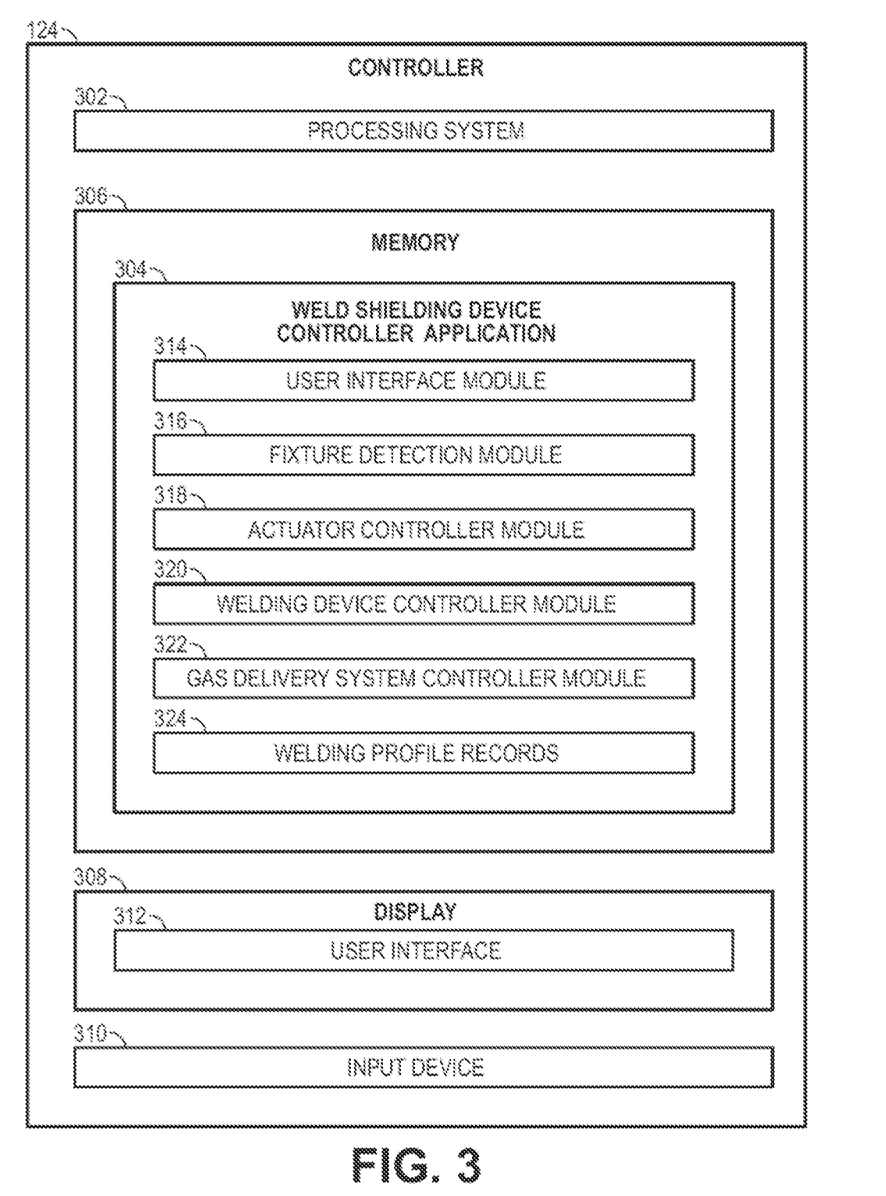
FIG. 3 illustrates one example of a controller that may be used to control the operation of the resistance weld shielding device according to one embodiment of the present disclosure.

FIG. 3 illustrates one example of the controller 124 that may be used to control the operation of the weld shielding device 100 according to one embodiment of the present disclosure. As shown, the controller 124 includes a processing system 302 that executes a weld shielding device controller application 304 stored in a memory 306 (e.g., computer readable media). Although the controller 124 is shown and described as a computer-based design incorporating instructions stored in a memory 306 and executed by a processor 302, it should be understood that the controller 124 may be embodied in other specific forms, such as using discrete and/or integrated analog circuitry, field programmable gate arrays (FPGAs), application specific integrated circuitry (ASICs), or any combination thereof. Additionally, the controller 124 may be omitted if manual operation of the weld shielding device 100 is desired.

The processing system 302 includes one or more processors or other processing devices and memory. The one or more processors may process machine/computer-readable executable instructions and data, and the memory may store machine/computer-readable executable instructions and data including one or more applications, including the application 304. A processor is hardware and memory is hardware. The memory 306 includes random access memory (RAM) and/or other non-transitory memory, e.g., a non-transitory computer-readable medium such as one or more flash disks or hard drives. The non-transitory memory may include any tangible computer-readable medium including, for example, magnetic and/or optical disks, flash drives, and the like.

The controller 124 may also include a display 308, such as a liquid crystal display (LCD), one or more light emitting diodes (LEDs), an LED display, a touch screen, a capacitive display, or another display for displaying configuration settings associated with the application 304. The controller 124 may also include an input device 310, such as one or more buttons, switches, or other electro-mechanical device for providing user input to the application 304. In one example, the display 308 and input device 310 may include a touch screen display for receiving user input and displaying one or more characteristics associated with operation of the application 304. In one embodiment, the display 308 may include a user interface 312 for displaying information to the user, and receiving user input from the user.

In general, the processing system 302 executes a weld shielding device operation application 304 with one or more modules to control the operation of the weld shielding device 100. In certain embodiments, the application 304 may control all operating aspects of the weld shielding device 100 described herein. In other embodiments, the application 304 may control only one or a subset of the operating aspects of the weld shielding device 100 described herein.

A user interface module 314 facilitates the receipt of user data and/or other communications from the input device 310 of the controller 124. In one example, the controller 124 generates and executes the user interface 312 that displays an interactive display such as the display 308, or other suitable user interface mechanism including one or more selectable fields, editing screens, and the like for displaying status information associated with one or more aspects of the application 304, such as operational status information, inert gas source condition, welding device conditions, timer values to be applied to the operation of the welding robot, and the like.

A fixture detection module 316 detects the presence of a fixture on the welding robot and may perform one or more actions based upon the detection of the fixture 112. For example, the fixture detection module 316 may ensure that the fixture is properly placed on the welding robot 102 before allowing the welding operation to be performed. As another example, the fixture detection module 316 may ensure that the fixture is configured for use with that welding robot prior to allowing its use with that welding robot.

In one embodiment, the fixture may include an integrated circuit chip, a QR code, a bar code, or other device storing a unique identifying code that can be read by the fixture detection module 316 to uniquely identify that fixture from among multiple other fixtures and select a welding profile record 324 to be used for controlling the operation of the welding robot. For example, a certain group of parts to be welded may be associated with a particular welding profile for those parts. In general, a welding profile includes information about various parameters to be used by the welding robot to perform the welding operation on those parts in which the parameters may include information, such as how long the parts are to receive weld energy from the welding device, the level of welding energy to be applied to the parts, a specified amount of time that the inert gas flow is to be applied the electrical energy is applied to the parts, and/or a specified amount of time that the inert gas is to be applied after the electrical energy is applied to the parts. Because the fixture is uniquely customized for receiving and holding a particular arrangement of parts, once the fixture detection module 316 identifies a unique identity of the fixture, a welding profile record 324 may be obtained for customizing the weld parameters to be applied to the welding operation for that specified fixture.

An actuator controller module 318 is coupled to the actuators configured on the welding robot and controls the operation of the actuators. For example, the actuator controller module 318 may control one or more actuators to move the fixture away from the electrodes 106 for allowing placement of the parts onto the fixture 112, and move the fixture 112 towards the electrodes 106 to facilitate the welding process. As another example, the actuator controller module 318 may move the electrodes 106 away from the fixture 112 for allowing movement of the fixture 112, and move the electrodes 106 towards the fixture 112 for performing the welding operation.

A welding device controller module 320 is coupled to the welding device configured on the welding robot for controlling its operation. For example, the welding device controller module 320 may control the welding device to apply electrical energy to the parts at a specified start time, a specified end time. Additionally, the welding device controller module 320 may control the welding device to apply a certain level of electrical energy as specified in the welding profile for the identified fixture. In one embodiment, the welding device controller module 320 may control the welding device to apply a specified profile of electrical energy to the parts during the welding procedure. For example, the welding device controller module 320 may initially apply electrical energy at a first level (e.g., 25 amperes) during a first duration (e.g., 1.5 seconds), and apply electrical energy at a second level (e.g., 15 amperes) during a second duration (e.g., 3.4 seconds) of the welding operation.

A gas delivery system controller module 322 is coupled to the valve of the gas delivery system for controlling its operation. For example, the gas delivery system controller module 322 may control the gas delivery system to apply an inert gas flow to the parts at a specified start time and at a specified end time. Additionally, the gas delivery system controller module 322 may control the gas delivery system to apply a certain flow rate as specified in the welding profile for the identified fixture. In one embodiment, the gas delivery system controller module 322 may control the gas delivery system to apply a specified profile of inert gas flowrate to the parts during the welding procedure. For example, the gas delivery system controller module 322 may control the gas delivery system to direct the inert gas onto the part for a specified period of time before the electrical energy is applied to the parts and/or direct the inert gas onto the part for a specified period of time after the welding device has finished applying electrical energy to the parts. Such a feature may be useful for purging the ambient environment around the parts prior to welding the parts, and allowing the parts to cool after the welding operation has been completed. Additionally, the gas delivery system controller module 322 may control the gas delivery system to apply the inert gas flow at different rates during the welding operation. For example, the gas delivery system controller module 322 may control the gas delivery system to initially apply the inert gas at a flow rate of 3.5 cubic inches per second and ramp down the flow to a rate of 1.5 cubic inches per second at the completion of the welding procedure.

It should be appreciated that the modules described herein are provided only as an example of a computing device that may execute the application 304 according to the teachings of the present invention, and that other computing devices may have the same modules, different modules, additional modules, or fewer modules than those described herein. For example, one or more modules as described in FIG. 3 may be combined into a single module. As another example, certain modules described herein may be encoded and executed on other circuits, such as another circuit that is separate from the controller 124.

Figure 4:
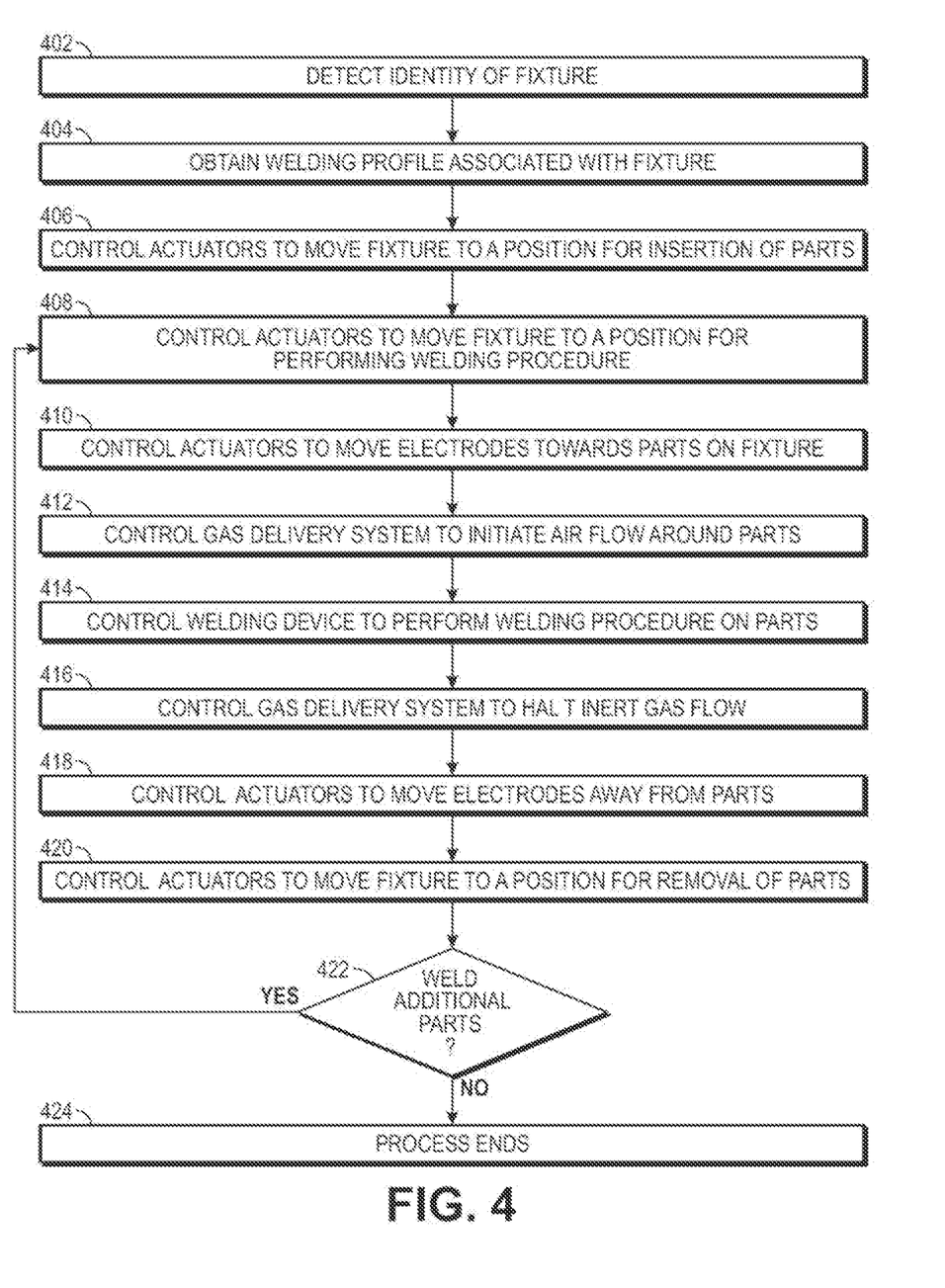
FIG. 4 illustrates an example process that may be performed by the application according to one embodiment of the present disclosure to control the operation of the resistance weld shielding device.

FIG. 4 illustrates an example process that may be performed by the application 304 according to the teachings of the present disclosure to control the operation of the weld shielding device 100. Although the example process described herein below is directed primarily to a computer-based application implemented in a memory and executed by a processor, the steps described herein may also be applicable to other types of controllers, such as a digital or analog hardware circuit employing discrete electrical components.

Initially in step 402, the application 304 detects the presence of a fixture on the welding device. For example, the fixture may have been recently disposed on the welding device for performing a manufacturing process that includes a welding procedure to weld two or more parts together. Upon detection of the fixture, the application 304 obtains a welding profile associated with the fixture at step 404. In one embodiment, the application 304 may inhibit further use of the welding device if an associated welding profile record is not found for the identified fixture. For example, if a fixture from an obsolete project may have been inadvertently placed on the welding device, the application 304 may recognize that the fixture is invalid for any current manufacturing project and inhibit further use of that fixture on the welding device.

At step 406, the application controls one or more actuators configured on the welding device to move the fixture to a position for insertion of the part to be welded. After the parts are inserted onto the fixture, the application may then control the actuators to move the fixture to position for performing the welding procedure at step 408. For example, after the parts have been manually inserted by a user, the user may press a button, or other alerting device, no notify the application that the parts have been inserted into the fixture so that the application may move the fixture to a position for welding the parts.

At step 410, the application controls one or more other actuators for moving the electrodes to a position for welding the parts. Thereafter at step 412, the application controls the gas delivery system to initiate an inert gas flow around the parts. In one embodiment, the inert gas flow is initiated prior to starting of the welding procedure. Such as feature may be beneficial for purging the ambient environment around the parts so that a relatively purer environment may be provided. Thereafter at step 414, the application controls the welding device to perform the welding procedure. After completion of the welding procedure, the application controls the gas delivery system to stop the gas flow at step 416. In one embodiment, the application controls the gas delivery system to continue the inert gas flow for a specified period of time after the welding procedure has been completed. Such as feature may be beneficial so that the parts may cool down to a level to reduce and/or eliminate oxidation that could otherwise occur at the weld area.

At step 418 the application controls the actuators to move the electrodes away from the fixture, and move the fixture to a position for removal of the welded parts at step 420. At this point, the user may manually remove the welded parts from the fixture and optionally insert one or more new parts to be welded in an ensuing welding procedure. Thus, at step 422, the application determines whether additional parts are to be welded. If so, processing continues at step 408 in which the fixture is moved to a position for welding the newly inserted parts; otherwise processing continues at step 424 in which the process ends.

Processing continues for additional usage cycles of the weld shielding device 100 as described above with reference to steps 402 through 422. Nevertheless, when use of the weld shielding device 100 and associated application 504 are no longer needed or desired, the process ends in step 624.

Figure 5:
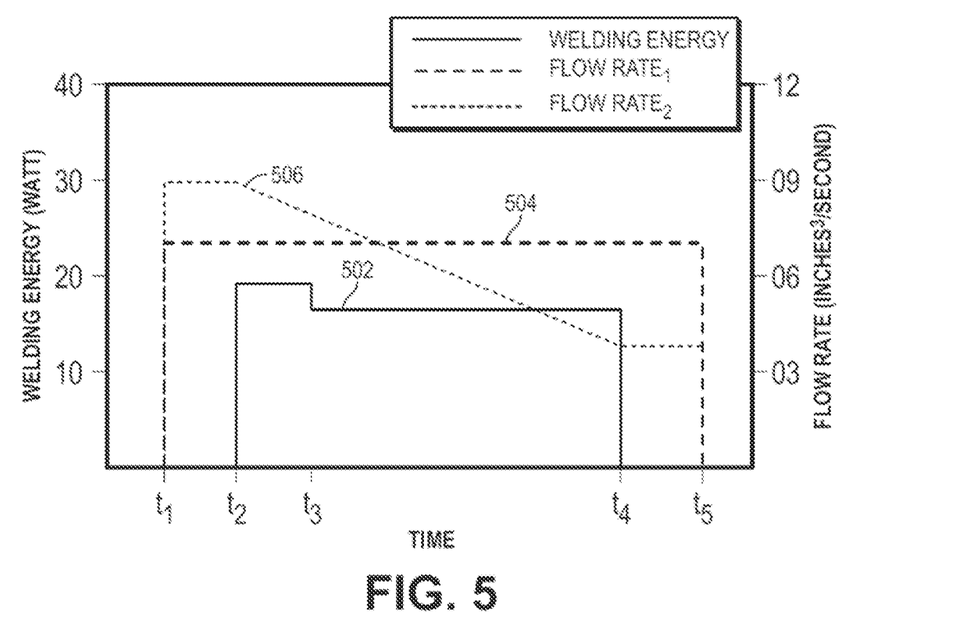
FIG. 5 illustrates several example welding profiles that may be used by the resistance weld shielding system according to one embodiment of the present disclosure.

FIG. 5 illustrates several example welding profiles that may be used by the weld shielding system 100 according to one embodiment of the present disclosure. In general, the welding profiles are displayed as a graph showing when and at what level welding energy is delivered to the parts to be welded, and when and at what flow rate the inert gas is delivered to the parts to be welded. A first welding profile is represented as a welding energy plot 502 that is used with a first inert gas flow rate plot 504, while a second welding profile is represented as the welding energy plot 502 when used with a second inert gas flow rate plot 506. Additionally, the information included in the example welding profiles may be stored as a welding profile record 324 in the memory of the controller 124 and accessed when the parts associated with the welding profile 500 are to be welded.

Before the welding profile is performed, the parts are mounted in the fixture, and the fixture moved to a position to be accessed by the electrodes of the welding device. To perform the first welding profile, at time t1, the controller 124 turns the gas delivery system 108 to deliver an inert gas flow at a certain rate, which in this particular example, is approximately 8.0 cubic-inches-per-second. Thereafter at time t2, the controller 124 turns on the welding device 104 to deliver welding energy to the parts at a specified level, which in this particular example, is approximately 20 Watts. The elapsed time between time t2 and time t1 may be any suitable length. In a particular example, the elapsed time may be 3 seconds.

In one embodiment, the controller 124 may be configured to adjust or modify the level of energy imparted into the parts during the welding procedure. For example, the controller 124 may at time t3, control the welding device 104 to adjust the level of welding energy imparted to the parts to be approximately 17 Watts. Such a feature may be beneficial for cases where welding energy may be imparted at a first level to initiate the welding procedure and reduced as the metals of the parts begin to liquefy and flow around each other. Nevertheless, the welding energy is continued at the second level until time t4. Although the present example describes a welding procedure in which the level is modified, it should be understood that modifying the level of the welding energy during the welding procedure may be omitted if not needed or desired.

At time t5, the controller 124 controls the gas delivery system 108 to halt the inert gas flow around the parts. Thus, the controller 124 continues to deliver the inert gas flow after the welding procedure has ceased. Such a feature may be beneficial to continually shield the parts until the parts have been allowed to cool for enhanced protection from unwanted oxidation that may otherwise occur without post-weld shielding.

In one embodiment, the controller 124 may be configured to adjust or modify the flow rate of the inert gas flow during the welding operation. The second welding profile shows how the inert gas flow may be modified during a welding operation performed according to the second welding profile. The welding energy plot 502 for the second welding profile is similar to the welding energy plot 502 for the second welding profile.

To perform the second welding profile, at time t1, the controller 124 turns the gas delivery system 108 to deliver an inert gas flow at a certain rate, which in this particular example, is approximately 10.5 cubic-inches-per-second. Thereafter at time t2, the controller 124 turns on the welding device 104 to deliver welding energy to the parts at a specified level, which in this particular example, is approximately 20 Watts. Additionally at time t2, the controller 124 controls the gas delivery system 108 to proportionally control the gas delivery system 108 to gradually decrease the flow rate until it is approximately 5.0 cubic-inches-per-second at time t4. At time extending from time t4 to time t5, the controller 124 controls the gas delivery system 108 to deliver a constant air flow, which in this particular example, is approximately 5.0 cubic-inches-per-second.

Thus as can be seen, the controller 124 may control the welding device to deliver welding energy at any desired level and duration, as well as inert gas flow at any desired rate and duration to the parts to be welded. Additionally, the welding energy level and inert gas flow rate may be modified during the welding operation for achieving an optimal weld joint between the parts.

The welding energy levels, the inert gas flow rates, and their associated durations may be selected according to the physical dimensions of the parts, the type of metal that the parts are made of (e.g., carbon steel, stainless steel, aluminum, molybdenum, nickel, etc.), the shape of the parts, and the like. Additionally, the welding energy levels, the inert gas flow rates, and their associated durations may be selected according to an orientation of the parts (e.g., horizontal welds, vertical welds, overhead welds, etc.). Thus, the welding profile associated with a fixture adapted to receive and hold one set of parts may be different from the welding profile associated with another fixture adapted to receive and hold another set of parts. The controller 124 may store each of these welding profiles as welding profile records 324 so that the welding robot 102 may be changed for performing different welding operations in a relatively quick and efficient manner.

Figure 6:
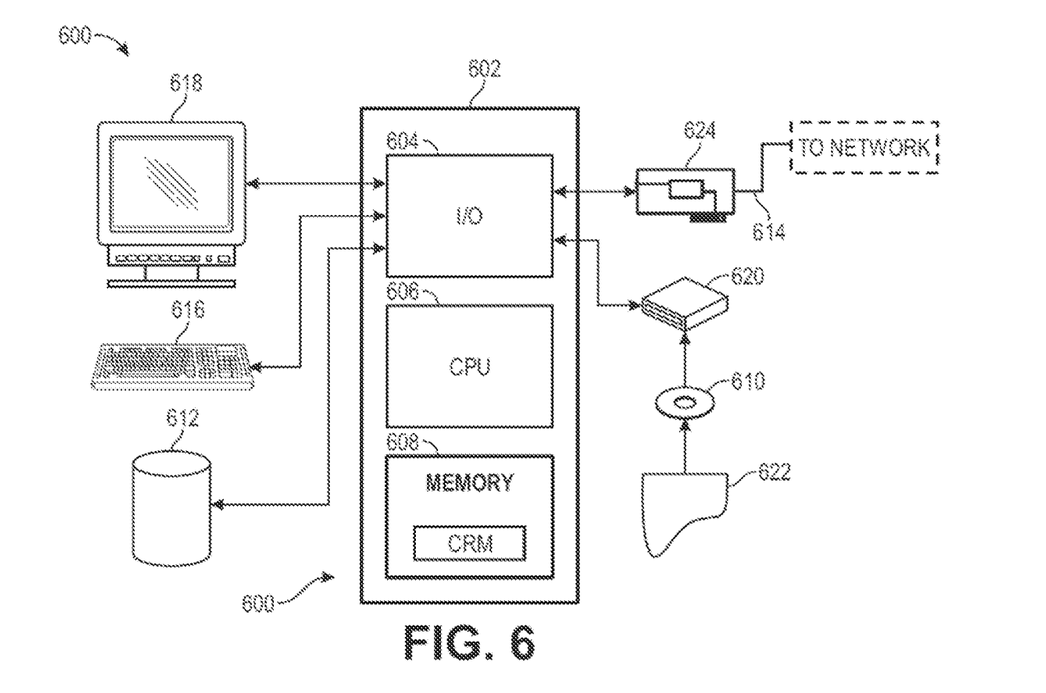
FIG. 6 illustrates a block diagram of an example computer device for use with the example embodiments.

FIG. 6 illustrates an example computing system 600 that may implement various systems, such as the controller 124, and methods discussed herein, such as process 600. A general purpose computer system 600 is capable of executing a computer program product to execute a computer process. Data and program files may be input to the computer system 600, which reads the files and executes the programs therein such as the application 504. Some of the elements of a general purpose computer system 600 are shown in FIG. 6 wherein a processing system 602 is shown having an input/output (I/O) section 604, a hardware central processing unit (CPU) 606, and a memory section 608. The processing system 602 of the computer system 600 may have a single hardware central-processing unit 606 or a plurality of hardware processing units. The computer system 600 may be a conventional computer, a server, a distributed computer, or any other type of computing device, such as one or more external computers made available via a cloud computing architecture. The presently described technology is optionally implemented in software devices loaded in memory 608, stored on a configured DVD/CD-ROM 610 or storage unit 612, and/or communicated via a wired or wireless network link 614, thereby transforming the computer system 600 in FIG. 6 to a special purpose machine for implementing the described operations.

The memory section 608 may be volatile media, nonvolatile media, removable media, non-removable media, and/or other hardware media or hardware mediums that can be accessed by a general purpose or special purpose computing device. For example, the memory section 608 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable instructions, data structures, program modules, algorithms, and/or other data. The communication media may also include a non-transitory information delivery technology. The communication media may include wired and/or wireless connections and technologies and be used to transmit and/or receive wired and/or wireless communications.

The I/O section 604 is connected to one or more optional user-interface devices (e.g., a user interface such as a keyboard 616 or the user interface 512), an optional disc storage unit 612, an optional display 618, and an optional disc drive unit 620. Generally, the disc drive unit 620 is a DVD/CD-ROM drive unit capable of reading the DVD/CD-ROM medium 610, which typically contains programs and data 622. Computer program products containing mechanisms to effectuate the systems and methods in accordance with the presently described technology may reside in the memory section 608, on a disc storage unit 612, on the DVD/CD-ROM medium 610 of the computer system 600, or on external storage devices made available via a cloud computing architecture with such computer program products, including one or more database management products, web server products, application server products, and/or other additional software components. Alternatively, a disc drive unit 620 may be replaced or supplemented by a hard drive unit, a tape drive unit, or other storage medium drive unit. An optional network adapter 624 is capable of connecting the computer system 600 to a network via the network link 614, through which the computer system can receive instructions and data. Examples of such systems include personal computers, Intel or PowerPC-based computing systems, AMD-based computing systems, ARM-based computing systems, and other systems running a Windows-based, a UNIX-based, a mobile operating system, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 600 is connected (by wired connection and/or wirelessly) to a local network through the network interface or adapter 624, which is one type of communications device. When used in a WAN-networking environment, the computer system 600 typically includes a modem, a network adapter, or any other type of communications device for establishing communications over the wide area network. In a networked environment, program modules depicted relative to the computer system 600 or portions thereof, may be stored in a remote memory storage device. It is appreciated that the network connections shown are examples of communications devices for and other means of establishing a communications link between the computers may be used.

In an example implementation, source code executed by the controller 124, a plurality of internal and external databases optionally are stored in memory of the controller 124 or other storage systems, such as the disk storage unit 612 or the DVD/CD-ROM medium 610, and/or other external storage devices made available and accessible via a network architecture. The source code executed by the controller 124 may be embodied by instructions stored on such storage systems and executed by the processing system 602.

Some or all of the operations described herein may be performed by the processing system 602, which is hardware. Further, local computing systems, remote data sources and/or services, and other associated logic represent firmware, hardware, and/or software configured to control operations the system 100 and/or other components. The system set forth in FIG. 6 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium (e.g., hard disk drive), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A resistance weld shielding apparatus comprising:
a fixture having a receptacle to receive and hold a part;
an electrode to apply electrical energy to the part for welding the part while the part is held in the receptacle;
a gas delivery system comprising a nozzle to direct an inert gas onto the part while the part is held in the receptacle, the nozzle directing the gas onto the part such that the gas shields the part from the ambient atmosphere when the part is being welded, the nozzle configured in the fixture such that the fixture holds the nozzle in a fixed physical relationship to the part; and
the fixture including a first member and a second member, the first member having a slot formed in a first surface, the first member being positioned adjacent to the second member such that the slot and the second member define a channel in the fixture, the channel coupling the nozzle to a gas supply line coupling.

2. The resistance weld shielding apparatus of claim 1, wherein the slot in the first surface and a second surface of the second member define the channel.

3. The resistance weld shielding apparatus of claim 1, wherein the nozzle is one of multiple nozzles configured in the fixture, each of the nozzle directing the inert gas at different regions around the part.

4. The resistance weld shielding apparatus of claim 1, wherein the electrode is configured to apply the electrical energy to the part so as to weld the part using a resistance welding technique.

5. The resistance weld shielding apparatus of claim 1, wherein the fixture is configured for placement on a welding robot that controls the welding of the part, movement of the fixture, and delivery of the inert gas onto the part.

6. The resistance weld shielding apparatus of claim 1, further comprising:
a control circuit comprising at least one non-transitory memory for storing instructions that when executed by at least one processor, is executed to:
control application of the electrical energy from the electrode to the part; and
control direction of the inert gas onto the part.

7. The resistance weld shielding apparatus of claim 6, wherein direction of the inert gas onto the part is controlled such that the inert gas is directed onto the part for a specified period of time before the electrical energy is applied to the parts.

8. The resistance weld shielding apparatus of claim 6, wherein direction of the inert gas onto the part is controlled such that the inert gas is directed onto the part for a specified period of time after the electrode has finished applying the electrical energy to the part.

9. The resistance weld shielding apparatus of claim 6, wherein direction of the inert gas onto the part is controlled such that a flowrate of the inert gas is adjusted according to one or more profile segments of a welding profile established for the part to be welded.

10. The resistance weld shielding apparatus of claim 9, wherein the profile segments include at least one of a pre-weld profile segment, a welding profile segment, and a post-weld profile segment.

11. The resistance weld shielding apparatus of claim 9, wherein the adjustment of the flowrate includes modifying the flowrate as the parts are being welded.

12. The resistance weld shielding apparatus of claim 9, wherein the instructions are further executed to:
obtain one of a plurality of welding profile records from the at least one memory,
the part comprising a particular part and the fixture comprising a particular fixture adapted to receive and hold the particular part,
the obtained welding profile record being associated with the particular fixture; and
wherein direction of the inert gas onto the part is controlled such that the flowrate of the inert gas is adjusted according to the obtained welding profile.

* * * * *